United States Patent [19]
Higaki

[11] Patent Number: 5,539,492
[45] Date of Patent: Jul. 23, 1996

[54] CAMERA HAVING THE SELF-TIMER PHOTOGRAPHING FUNCTION

[75] Inventor: Riichi Higaki, Kawasaki, Japan

[73] Assignee: Nikon Corporation, Tokyo, Japan

[21] Appl. No.: 356,119

[22] Filed: Dec. 15, 1994

[30] Foreign Application Priority Data

Dec. 16, 1993 [JP] Japan .................................. 5-317037

[51] Int. Cl.$^6$ .............................. G03B 7/08; G03B 13/36; G03B 17/40
[52] U.S. Cl. ...................... 354/400; 354/410; 354/238.1
[58] Field of Search ................................ 354/238.1, 410, 354/400

[56] References Cited

U.S. PATENT DOCUMENTS 4,542,970  9/1985  Suzuki et al. .......................... 354/400

*Primary Examiner*—W. B. Perkey

[57] ABSTRACT

In order to delay the timing of photographing easily without releasing a self-timer even after the self-timer has been operated and also, to enable distance measurement or photometry to be easily effected over again without releasing the self-timer even after the self-timer has been operated, a camera has a self-timer, a self-timer extension switch and a control device responsive to the self-timer extension switch during the operation of the self-timer to control so as to effect the time extension of the self-timer.

11 Claims, 5 Drawing Sheets

CAMERA HAVING THE SELF-TIMER PHOTOGRAPHING FUNCTION

BACKGROUND OF THE INVENTION

1. Field of the Invention

This invention relates to a camera having the self-timer photographing function.

2. Related Background Art

Some of conventional cameras have the self-timer photographing function. This function is used when a photographer becomes an object or when a photographer wants to effect photographing while keeping himself or herself apart from a camera. The self-timer photographing function has included a type in which a camera is set to the self-timer mode, whereafter the camera is started by a release button being pushed, and a type in which a self-timer starting switch is depressed, whereby a camera is started on the spot. In both of these types, the discontinuance of self-timer photographing has been effected by releasing the self-timer mode or by opening a power source switch.

There is a case where as shown in FIG. 6 of the accompanying drawings, after an operator 13 has operated a self-timer, a person 12 comes close between a camera 10 and an object 11 and therefore it is desired to delay the timing of photographing a little. There is also a case where after the self-timer has been operated, an object moves and it is desired to effect distance measurement and photometry over again. In such cases, it has been necessary to operate the self-timer again after the self-timer has once been released.

SUMMARY OF THE INVENTION

It is an object of the present invention to provide an apparatus which can easily delay the timing of photographing without releasing a self-timer even after the self-timer has been operated.

It is another object of the present invention to provide an apparatus which can easily effect distance measurement or photometry over again without releasing a self-timer even after the self-timer has been operated.

To solve the above-noted problems, the present invention has a self-timer, a self-timer extension switch and control means responsive to the self-timer extension switch during the operation of the self-timer to control so as to effect the time extension of the self-timer.

The present invention has distance measuring means and is designed such that the control means is responsive to the self-timer time extension switch during the operation of the self-timer to effect the distance measurement of the distance measuring means and the time extension of the self-timer.

The present invention has photometry means and is designed such that the control means is responsive to the self-timer time extension switch during the operation of the self-timer to effect the photometry by the photometry means and the time extension of the self-timer.

The apparatus provided by the present invention is designed such that when the self-timer time extension switch operates during the operation of the self-timer, the time extension process of the self-timer is carried out by a central processing device. Consequently, it becomes possible to delay the timing of self-timer photographing easily without releasing the self-timer each time it is desired to delay the timing of photographing after the self-timer has been operated.

Also, design is made such that distance measurement or photometry is effected over again when the time extension of the self-timer is effected and therefore, distance measurement or photometry can be easily effected without releasing the self-timer each time it is desired to effect distance measurement or photometry over again after the self-timer has been operated.

DETAILED DESCRIPTION OF THE PREFERRED EMBODIMENTS

Figure 1:
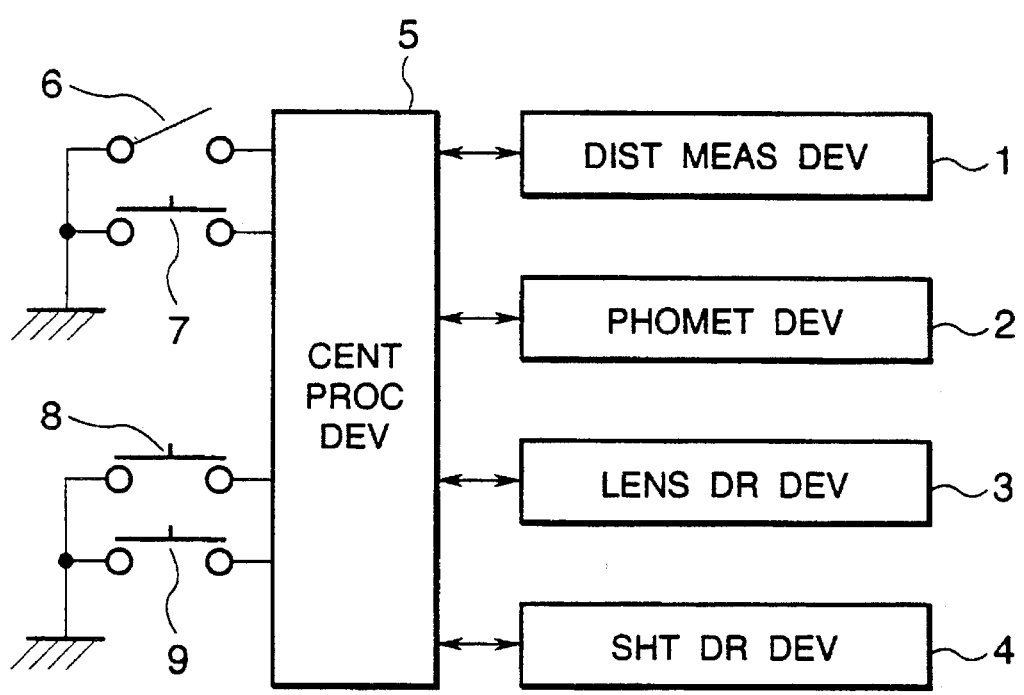
FIG. 1 is a block diagram showing the construction of a camera according to a first embodiment of the present invention.

The construction of a camera according to a first embodiment of the present invention is shown in the block diagram of FIG. 1.

A distance measuring device 1 is a device for detecting the distance of an object. The distance measuring device may be an active distance measuring device or a distance measuring device using a phase detecting method. A photometry device 2 is a device for photometering the object field. A lens driving device 3 is a device for driving a photo-taking lens, not shown. A shutter driving device 4 is a device for driving a shutter, not shown. A central processing device 5 is a device for controlling the distance measuring device 1, the photometry device 2, the lens driving device 3 and the shutter driving device 4. A self-timer mode switch 6 is a switch for setting a self-timer. The self-timer mode is set when the self-timer mode switch 6 is ON.

A self-timer time extension switch 7, a release button half-push switch 8 and a release button full-push switch 9 are switches to be operated by a photographer, and the operations thereof will be described later.

The self-timer of the camera, not shown, is contained in the central processing device 5.

Figure 2:
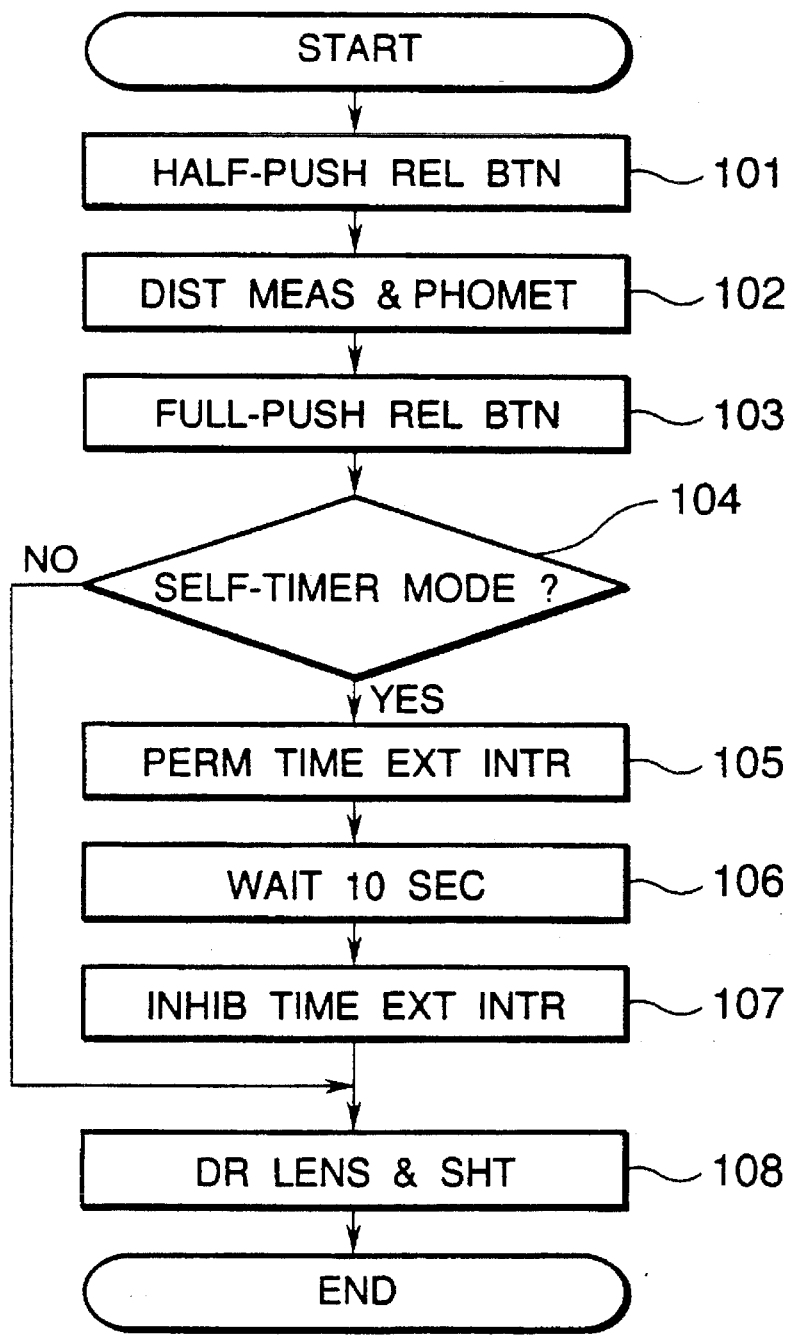
FIG. 2 is a flow chart of the operation of the camera according to the first embodiment of the present invention.

The operation of the camera of the present embodiment will now be described in accordance with the flow chart of FIG. 2.

First, at a step 101, this flow chart starts when the central processing device 5 recognizes the closing of the release button half-push switch 8, and advance is made to a step 102. At the step 102, the distance measuring device 1 effects distance measurement and the photometry device 2 effects photometry. Subsequently, at a step 103, the central processing device 5 recognizes the closing of the release button full-push switch 9, whereupon advance is made to a step 104.

At the step 104, whether the self-timer mode switch 6 is ON is judged. If at the step 104, NO (that is, the self-timer mode switch is OFF) is judged, it is judged that the camera is in the ordinary photographing mode, and advance is made to a step 108. The lens driving device 3 and the shutter driving device 4 are controlled on the basis of the results of the distance measurement and photometry at the step 102, thus terminating photographing.

On the other hand, if at the step 104, YES (that is, the self-timer mode switch is ON) is judged, it is judged that the camera is in the self-timer photographing mode, and advance is made to a step 105. At the step 105, the time extension interrupt of the central processing device 5 is permitted, and advance is made to a step 106. At the step 106, the camera waits for 10 sec. in the state in which the time extension interrupt is permitted, whereafter advance is made to a step 107. At the step 107, the time extension interrupt is inhibited, and at the step 108, as in the case of the ordinary photographing mode, the lens and the shutter are driven, thus terminating photographing.

Description will hereinafter be made of a case where the time extension interrupt is effected in the above-described self-timer photographing mode. When the central processing device 5 detects the closing of the self-timer time extension switch 7 while the time extension interrupt is permitted, the time extension interrupt process is carried out and advance is made to the step 106. At the step 106, the waiting time of the self-timer after the interrupt process has been carried out is set to 10 sec.

Figure 3:
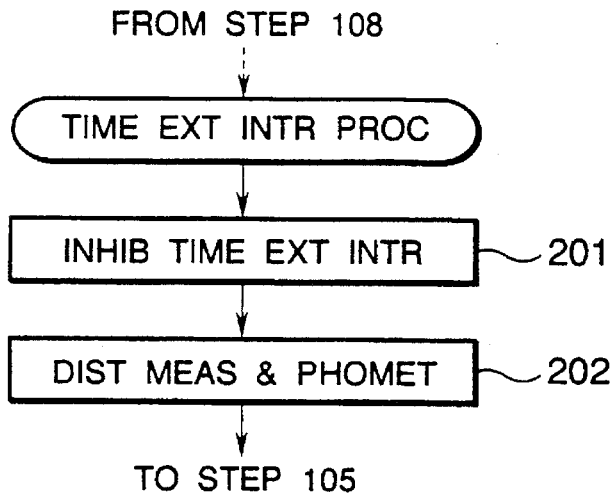
FIG. 3 is a flow chart of the interrupt process of a camera according to a second embodiment of the present invention.

The interrupt process in a second embodiment of the present invention will hereinafter be described with reference to FIGS. 2 and 3.

When the time extension interrupt is absent in the process of the step 101 to the step 108, the process is the same as that in the first embodiment and therefore need not be described.

When the central processing device 5 detects the closing of the self-timer time extension switch 7 while at the step 105 of the above-described self-timer photographing mode, the time extension interrupt is permitted, the time extension interrupt process is carried out advance is made to a step 201.

At the step 201, the time extension interrupt is inhibited, whereafter at a step 202, distance measurement and photometry are effected again and advance is made to the step 105. The lens driving and shutter driving at the step 108 after the time extension interrupt process has taken place are effected on the basis of the results of the distance measurement and photometry at the step 202.

Figure 4:
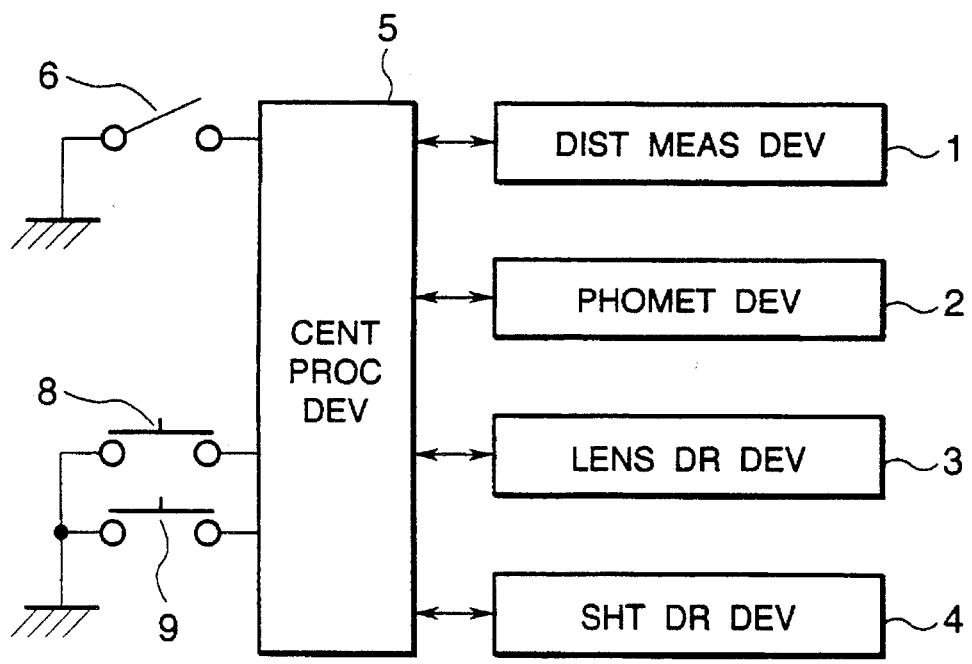
FIG. 4 is a block diagram showing the construction of a camera according to a third embodiment of the present invention.

A third embodiment of the present invention will now be described with reference to the block diagram of FIG. 4 showing the construction of a camera.

The distance measuring device 1, the photometry device 2, the lens driving device 3, the shutter driving device 4, the central processing device 5, the self-timer mode switch 6, the release button full-push switch 9 and the self-timer in this embodiment are the same as those shown in the first embodiment and therefore need not be described.

In the present embodiment, the self-timer time extension switch is used also as the release button half-push switch 8.

That is, the time extension interrupt process in the third embodiment starts when the central processing device 5 detects the closing of the release button half-push switch 8.

The other operations of this embodiment are similar to those of the first embodiment.

While the present embodiment has been described with respect to a camera having an extension switch for exclusive use and a camera having an extension switch used also as a release button, the self-timer mode switch 6 is used also as the time extension switch in another embodiment.

As described above, the self-timer time extension switch is used also as another switch, whereby the number of buttons can be decreased and thus, the cost can be curtailed.

Figure 5:
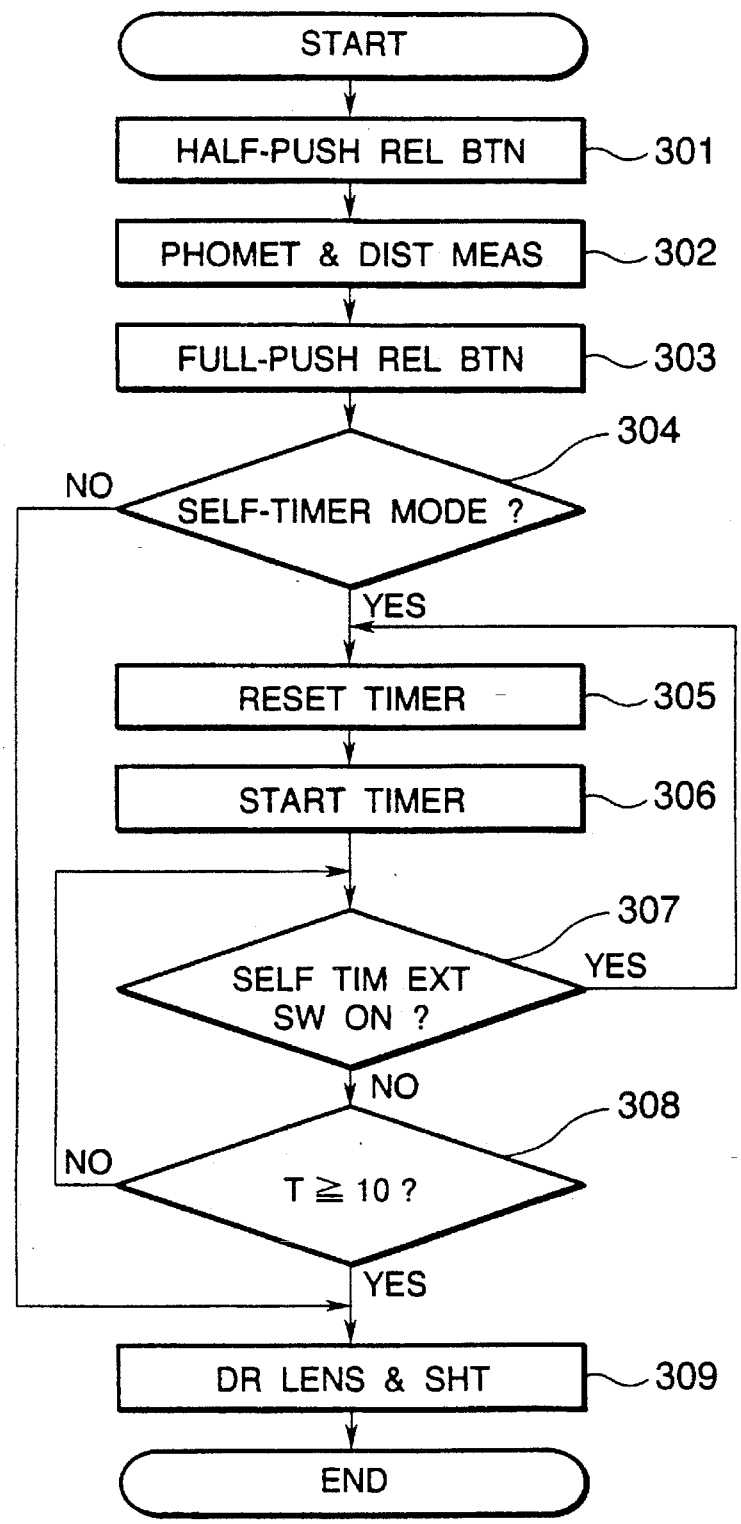
FIG. 5 is a flow chart showing the operation of a camera according to a fourth embodiment of the present invention.
Figure 6:
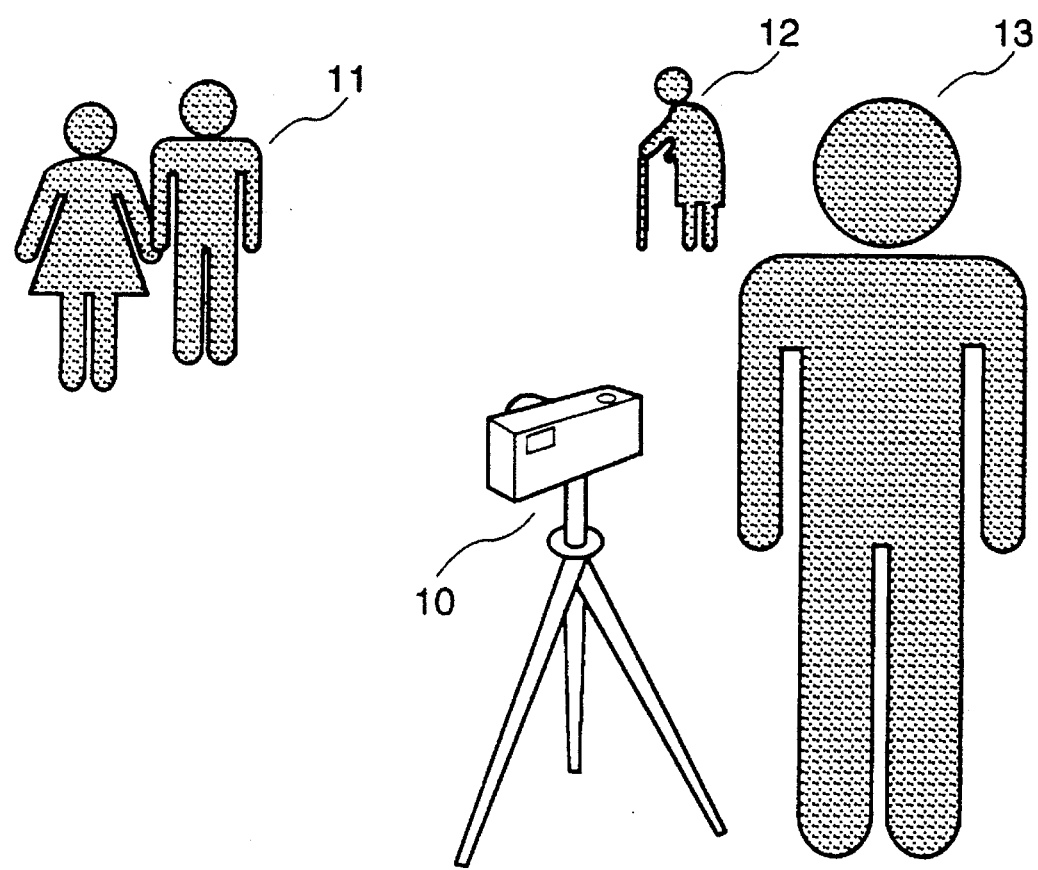
FIG. 6 shows the photographing situation of a camera.

A fourth embodiment of the present invention will now be described with reference to the flow chart of FIG. 5.

In the fourth embodiment, the time extension of the self-timer is done without the use of the interrupt process.

Steps 301 to 304 are the same as the processes of the steps 101 to 104 in the first embodiment and therefore need not be described.

If at the step 304, NO is judged, advance is made to a step 309. The step 309 and subsequent step are the same as the processes of the step 108 and subsequent step in the first embodiment and therefore need not be described.

If at the step 304, YES is judged, advance is made to a step 305, where the self-timer is reset, and advance is made to a step 306. At the step 306, the timer is started, and advance is made to a step 307. At the step 307, whether the self-timer time extension switch 7 is ON is judged. If at the step 307, the answer is YES, advance is made to the step 305, where the timer is reset. If at the step 307, the answer is NO, advance is made to a step 308, where whether the timer time is 10 sec. or longer is judged. If at the step 308, the answer is YES, advance is made to the step 309. If at the step 308, the answer is NO, advance is made to the step 307, where whether the self-timer time extension switch 7 is ON is judged.

Also, the self-timer time extension switch 7 may be carried on a wireless remote controller so that the time of the self-timer may be extended. By adopting the remote controller, the time of the self-timer can be extended even if the photographer is apart from the camera.

According to the present invention, design is made such that when the self-timer time extension switch 7 operates during the operation of the self-timer, the time extension process of the self-timer is carried out and therefore, it becomes possible to delay the timing of self-timer photographing easily without releasing the self-timer each time it is desired to delay the timing of photographing after the self-timer has been operated.

Also, according to the present invention, design is made such that distance measurement is effected over again when the time extension of the self-timer is effected and therefore, distance measurement can be effected easily without releasing the self-timer each time it is desired to effect distance measurement over again after the self-timer has been operated.

Further, according to the present invention, design is made such that photometry is effected over again when the time extension of the self-timer is effected and therefore, photometry can be effected easily without releasing the self-timer each time it is desired to effect photometry over again after the self-timer has been operated.

What is claimed is:

1. A camera comprising:
   a delaying device for delaying the release operation by a predetermined time;
   a time extending switch for outputting a signal by being operated; and
   a control device responsive to the signal outputted from said time extending switch during the operation of said delaying device to control said delaying device so as to extend said predetermined time.

2. The camera of claim 1, further comprising:
   a distance measuring device for measuring the distance to an object, said control device being responsive to the signal outputted from said time extending switch during the operation of said delaying device to control said distance measuring device so as to effect distance measurement.

3. The camera of claim 2, wherein said control device does not respond to the signal from said time extending switch until distance measurement is terminated after said distance measuring device has been operated.

4. The camera of claim 1, further comprising:

a photometry device for photometering the object field, said control device being responsive to the signal outputted from said time extending switch during the operation of said delaying device to control said photometry device so as to effect photometry.

5. The camera of claim 4, wherein said control device does not respond to the signal from said time extending switch until photometry is terminated after said photometry device has been operated.

6. The camera of claim 1, wherein said time extending switch is operated in response to the depression of the release button of the camera.

7. The camera of claim 1, wherein said time extending switch is used also as the self-timer mode switch of the camera.

8. The camera of claim 1, wherein the time extended by the control of said control device has the same length as said predetermined time.

9. The camera of claim 1, wherein the signal outputted from said time extending switch is received by said control device within a signal reception permission time, and said control device is responsive to the signal outputted from said time extending switch to extend said predetermined time at any timing within said signal reception permission time.

10. The camera of claim 1, wherein said control device is responsive to the signal outputted from said time extending switch to restart said self-timer.

11. The camera of claim 1, provided with a time extending timer and wherein said control device is responsive to the signal outputted from said time extending switch to stop the operation of said delay device and thereafter operate said time extending timer.

* * * * *